(12) United States Patent
Helgesen et al.

(10) Patent No.: US 10,030,701 B2
(45) Date of Patent: Jul. 24, 2018

(54) MAGNETIC BEARING HAVING PERMANENT MAGNET ASSEMBLIES WITH REPULSIVE BEARING SURFACES

(71) Applicant: Giamag Technologies AS, Kjeller (NO)

(72) Inventors: Geir Helgesen, Finstadjordet (NO); Arne Skjeltorp, Ski (NO)

(73) Assignee: GIAMAG TECHNOLOGIES AS, Kjeller (NO)

(*) Notice: Subject to any disclaimer, the term of this patent is extended or adjusted under 35 U.S.C. 154(b) by 427 days.

(21) Appl. No.: 14/893,692

(22) PCT Filed: May 23, 2014

(86) PCT No.: PCT/EP2014/060707
§ 371 (c)(1),
(2) Date: Nov. 24, 2015

(87) PCT Pub. No.: WO2014/191323
PCT Pub. Date: Dec. 4, 2014

(65) Prior Publication Data
US 2016/0108957 A1    Apr. 21, 2016

(30) Foreign Application Priority Data

May 27, 2013  (NO) .................................. 20130733

(51) Int. Cl.
*F16C 32/04*   (2006.01)
*H01F 7/02*   (2006.01)
*F16C 31/00*   (2006.01)

(52) U.S. Cl.
CPC ...... *F16C 32/0425* (2013.01); *F16C 32/0423* (2013.01); *H01F 7/0268* (2013.01);
(Continued)

(58) Field of Classification Search
CPC .... F16C 32/0425; F16C 32/0423; H02K 7/09
(Continued)

(56) References Cited

U.S. PATENT DOCUMENTS

| 3,233,950 A | 2/1966 | Baermann |
| 3,958,842 A | 5/1976 | Telle |

(Continued)

FOREIGN PATENT DOCUMENTS

| DE | 1017871 B | 10/1957 |
| EP | 1842596 A1 | 10/2007 |

(Continued)

OTHER PUBLICATIONS

E. I. Il'yashenko et al., "Permanent magnet systems with strong stray magnetic fields and very high gradients for material separation", Physica Status Solidi a 203, No. 7, pp. 1556-1560 (2006) / DOI 10.1002/pssa.200563128, Wiley InterScience.

(Continued)

*Primary Examiner* — Jeremy Luks
(74) *Attorney, Agent, or Firm* — Christopher & Weisberg, P.A.

(57) ABSTRACT

The magnetic bearings make use of magnet assemblies with a high magnetic field gradient. The magnet assemblies use two permanent magnets with opposite polarization in a Kittel open domain structure. The basic factor of magnetic separation is the magnetic force, which acts on a particle of the substance and which is proportional to the magnetic susceptibility of the substance, the value of the magnetic induction B and the value of the gradient ∇B of the applied magnetic field. Therefore, increasing the sensitivity and selectivity of magnetic separation will require use of the highest possible values of magnetic induction B and magnetic field gradient ∇B, or their united factor—the product B∇B. The magnetic assembly have repulsive magnetic systems each having two juxtaposed permanent magnets 2, 4 with opposite magnetization in the form of a Kittel open domain structure. In such an system, near the edges of the (Continued)

faces of the joining magnets, a strong magnetic stray field appears and the value of the product $B\nabla B$ reaches $10^{11}$ $mT^2/m$. To concentrate the magnetic stray field shields 6 are provided on top of the two magnets 2,4 with a gap 8 between the shields at the joint of the two magnets 2, 4 forming zones of high magnetic field gradient 14 with increased magnitude for the product $B\nabla B$.

18 Claims, 7 Drawing Sheets

(52) U.S. Cl.
CPC .......... *F16C 31/00* (2013.01); *F16C 2240/46* (2013.01); *F16C 2240/60* (2013.01); *F16C 2300/02* (2013.01)

(58) Field of Classification Search
USPC ....................................................... 310/90.5
See application file for complete search history.

(56) References Cited

U.S. PATENT DOCUMENTS

| | | |
|---|---|---|
| 4,072,370 A | 2/1978 | Wasson |
| 4,948,208 A | 8/1990 | Schubert |
| 2003/0155830 A1* | 8/2003 | Beyer ................... F04D 19/048 310/90.5 |
| 2010/0012591 A1 | 1/2010 | Glebov et al. |
| 2012/0293028 A1* | 11/2012 | Kim ....................... H02K 7/085 310/90 |
| 2014/0199179 A1* | 7/2014 | Da Silva ............... F04D 29/058 417/44.1 |

FOREIGN PATENT DOCUMENTS

| | | |
|---|---|---|
| GB | 946701 A | 1/1964 |
| JP | S54139007 A | 10/1979 |
| JP | 2002333018 A | 11/2002 |
| JP | 2004270673 A | 9/2004 |

OTHER PUBLICATIONS

International Search Report and Written Opinion dated Oct. 29, 2014 for International Application Serial No. PCT/EP2014/060707, International Filing Date: May 23, 2014, consisting of 12 pages.

Norwegian Search Report dated Nov. 14, 2013 for corresponding Norwegian Application Serial No. 20130733, Norwegian Filing Date: May 27, 2013, consisting of 2 pages.

* cited by examiner

MAGNETIC BEARING HAVING PERMANENT MAGNET ASSEMBLIES WITH REPULSIVE BEARING SURFACES

CROSS-REFERENCE TO RELATED APPLICATIONS

This application is a Submission under 35 U.S.C. § 371 for U.S. National Stage Patent Application of, and claims priority to, International Application Number PCT/EP2014/060707, filed May 23, 2014, entitled "MAGNETIC BEARING HAVING PERMANENT MAGNET ASSEMBLIES WITH REPULSIVE BEARING SURFACES," which is related to and claims priority to Norwegian Patent Number 335600, filed May 27, 2013, the entire contents of both of which are hereby incorporated herein by reference.

The current invention relates to magnetic bearings, for example to bearings for supporting a rotating or sliding shaft.

Bearings are used to mechanically support moving parts and also optionally to guide their movement. Various types of bearings exist, and they can be broadly grouped based on the types of motions that they provide for and/or based on the principles of operation. The motion can be an axial rotation, such as rotation of a shaft, a sliding or linear movement, spherical rotation (ball joint) or a hinge motion. There are also variations within those types of motion, for example where a bearing supports a rotating shaft this can be done by a journal bearing, where the support from the bearing is mainly along the radial direction of the shaft, or by a thrust bearing, where the support from the bearing is mainly along the axial direction of the shaft. Known operating principles for bearings include plain bearings, ball or roller bearings, fluid bearings and magnetic bearings.

Plain bearings use rubbing contact between the moving parts. They are simple but not high performance, although with suitable lubrication they can provide more than adequate performance for many applications. Ball or roller bearings, which use balls or rollers between parts, allow for increased performance at the expense of increased complexity. With these types of bearings that use a mechanical contact there is mechanical friction and wear. These disadvantages can be avoided by means of fluid or magnetic bearings, where there is no mechanical contact of hard materials. Fluid bearings space apart the bearing surfaces using a fluid under pressure. Magnetic bearings use a magnetic field to carry the load and there is therefore no contact, which leads to very low friction and no mechanical wear. Windage is the only resistance to motion of the moving parts.

Magnetic bearings are therefore highly desirable for high performance applications where high speed is required. They are used in power generation and for machine tools. They are also desirable for specialist applications where the presence of oil or other lubricants would create problems, for example in turbomolecular pumps or in compressors for high purity fluids.

The majority of magnetic bearings are active magnetic bearings that use electromagnets to generate the required magnetic field. This requires a power source and also typically an active control system. If the power fails then the electromagnets will not be able to support a load. To address this then a back-up bearing is often provided. Some types of magnetic bearings use a combination of permanent magnets and electromagnets, with the permanent magnets supporting the static load on the bearing and the electromagnets being activated in use to address higher forces from dynamic loads.

Magnetic bearings using solely permanent magnets and being capable of supporting large forces are highly desirable.

Viewed from a first aspect, the invention provides a magnetic bearing comprising:

first and second bearing surfaces;

at least one magnet assembly on each bearing surface, wherein each magnet assembly includes: two permanent magnets located side-by-side with oppositely oriented magnetic field polarities and end surfaces of opposite polarities next to one another, wherein the magnetic anisotropy of the magnets exceeds the magnetic inductance of the material of the magnets; and a shield on a first end of the adjacent permanent magnets, the shield comprising a non-retentive material covering adjacent end surfaces of the two permanent magnets with a gap along a joining line between the two permanent magnets to form a zone of high-gradient magnetic field above the joining line;

wherein the magnet assembly on the first bearing surface provides a magnetic field opposed to the magnetic field of the magnet assembly on the second bearing surface, and wherein the magnetic bearing is arranged such that the first and second bearing surfaces are magnetically repelled from one another in mechanical equilibrium.

This magnetic bearing hence utilises a magnetic field formed in a Kittel open domain structure above the joining line of the permanent magnets in each magnet assembly. Such a magnetic field is very focussed and strong, which is advantageous for a magnetic bearing. This permits a magnetic bearing to be provided using permanent magnets rather than electromagnets and hence greatly expands the utility of magnetic bearings, since no power supply is required. Many of the problems with prior art permanent magnetic bearings are avoided due to the special characteristics of the magnet assembly that is used. The two permanent magnets are joined on their lateral sides so that at one end the north end of one of the magnets is adjacent the south end of the second of the magnets, and vice versa.

The magnetic bearing may include additional magnet assemblies with the same arrangement to that described above or with a different arrangement.

By mechanical equilibrium it is meant that the first and second bearing surfaces are in static equilibrium when at rest, and support the bearing load stably when in motion. There is no instability that could cause the opposing magnet assemblies to move into a configuration where they cannot support the static or dynamic loading on the bearing and in particular there is no instability that could cause the magnet assemblies to move into a position where there is a magnetic attraction rather than magnetic repulsion. Preferably the mechanical equilibrium is such that the bearing maintains a stable separation distance between the first and second bearing surfaces.

It is preferred for the two bearing surfaces to be close to one another since this type of magnetic field decreases in strength sharply with distance. Hence, in preferred embodiments the separation/clearance between the two bearing surfaces (at the locations of the opposed magnet assemblies) is small, for example less than 0.5 mm, preferably less than 0.4 mm and more preferably less than 0.2 mm. For the purposes of the magnetic repulsion there is no minimum for the separation, but clearly a minimum is required to allow for manufacturing tolerances and also to provide for a degree of misalignment or play for the parts that the bearing supports. Hence a suitable minimum spacing may be 0.005 mm, more preferably 0.01 mm.

In one example embodiment the magnets are generally rectangular in cross-section and the shield consists of two plates of non-retentive material on surfaces along edges of the rectangle. The gap in this arrangement is formed by spacing between the two plates along the joining line of the magnets. The shield may sit atop the magnets, such that the gap is an air gap bordered on two opposite sides by edges of the shield and on a third side by exposed parts of the magnets. Alternatively, the shield may be set into recesses in the magnets such that the exposed parts of the magnets protrude into the gap and partially or completely fill it. The latter arrangement allows for the bearing to have a smooth surface, which may reduce windage losses.

The proposed magnetic bearing may be used as any type of bearing, including rotating or sliding bearings, bearings supporting a shaft, bearings supporting a moving body on a rail or for freely sliding motion on a machine bed, hinge bearing, spherical (ball) joints and so on. The examples discussed below and in particular the examples set out in the description of the Figures and preferred embodiments are not intended to be limiting. Instead the basic principle of utilising opposed pairs of magnets with zones of high gradient magnetic fields can be adapted to many appropriate bearing applications. Thus, the bearing surfaces may be generally flat surfaces with opposed magnetic fields from generally flat magnet assemblies, or the bearing surfaces may be cylindrical, with cylindrical magnet assembles providing repelling forces to support a shaft during rotation. A shaft may also be supported for sliding movement by an arrangement of magnet assemblies along the length of tubular bearing surfaces, for example in a circular tube.

In a simple arrangement, which could be used for rotating or sliding bearings, the joining line of the magnet assembly on the first bearing surface is aligned with, in parallel with and directly opposes the joining line of the magnet assembly on the second bearing surface. This provides direct alignment of the magnetic fields and hence a strong repulsion but there is a risk of instability and therefore in this arrangement it is preferred for the bearing to also include a restraining mechanism to ensure that the two joining lines remain aligned. For example, a mechanical device may constrain the bearing surfaces such that they cannot move away from alignment. In a more preferred arrangement, which avoids the potential disadvantages of mechanical friction and wear, a further magnetic bearing is used to constrain the bearing surfaces. In one specific example, ring shaped magnet assemblies for a rotating bearing comprise magnetic bearings according to the first aspect of the invention.

In some preferred embodiments the joining lines are parallel but the centre of the magnetic field of the magnet assembly on the first bearing surface is offset by a small amount from the centre of the magnetic field of the magnet assembly on the second bearing surface. This allows a stable repulsion to be created by an appropriate geometry for the magnet assembles and/or by the use of additional magnet assemblies or mechanical bearings. The magnetic field has a tendency to increase the offset and this can be opposed to ensure stability. The offset should be selected based on the strength and size of the magnetic fields, the required bearing capabilities and the number of magnetic assemblies being used to provide the repulsive force for the bearings. In typical situations the offset may be in the range of 0.005 mm to 0.4 mm, more preferably 0.01 mm to 0.2 mm.

For example, ring shaped magnet assemblies may be provided with circular joining lines and an offset between the joining lines being provided by a difference in diameter. With this example the magnetic field for one of the bearing surfaces will sit concentrically within the magnetic field for the other and this will form a stable thrust bearing for supporting a shaft for rotating movement.

In another example the magnetic bearing may comprise at least two magnet assemblies on each bearing surface, preferably one or more pairs of magnet assemblies, wherein a first set of opposed magnet assemblies on the first and second bearing surfaces are offset from one another in a first direction, and a second set of opposed magnet assemblies on the first and second bearing surfaces are offset from one another in an opposite direction. Thus, with the magnetic fields viewed in cross-section the first set of magnet assemblies may have one field above the other and the centre of the upper field positioned to the left of the centre of the lower field, whereas the second set of magnet assemblies may have one field above the other and the centre of the upper field positioned to the right of the centre of the lower field. The offset for the first set of magnetic fields creates a tendency for the upper magnet assembly to move to the left, but this is opposed by the tendency for the upper magnet assembly of the second set to move to the right. The arrangement is therefore stable. The two sets of magnet assemblies extend in parallel with lines along the centres of the magnetic fields for one bearing surface being just within lines along the centres of the magnetic fields for the other bearing surface. This can be embodied as a sliding bearing, in which case the parallel lines would be like rails, or as a rotating bearing, in which case the parallel lines form nested rings.

In an alternative arrangement the joining line of the magnet assembly on the first bearing surface is at an angle to the joining line of the magnet assembly on the second bearing surface, preferably an angle of greater than 45 degrees and more preferably the joining lines of opposed magnet assemblies are perpendicular. With this arrangement the crossing point of the two joining lines provides the location for the repulsive force. When using a non-parallel arrangement of this type it is preferred to have a plurality of magnet assemblies on each bearing surface in order to create a plurality of crossing points. It should, however, be noted that a single magnet assembly formed in a spiral on a cylindrical bearing surface can provide the required plurality of crossing points when used with a second cylindrical bearing surface that has an opposite spiral.

The non-parallel magnet assemblies may be used for a sliding bearing for linear movement, for example by providing four or more crossing points to give a stable support on a flat bearing surface. Four crossing points can be provided by having two parallel magnet assemblies on the first bearing surface and two parallel magnet assemblies on the second bearing surface and arranging the bearing surfaces so that the respective magnet assemblies are at an angle to one another. A larger number of parallel magnet assemblies could be used to generate a large lattice of crossing points.

Other preferred embodiments use helical joining lines for the magnet assemblies, with one or more magnet assemblies forming a clockwise spiral about a first cylindrical bearing surface and one or more magnet assemblies forming an anticlockwise spiral about a second cylindrical bearing surface that is arranged to be concentric with the first bearing surface. With this arrangement the crossing points form a lattice about the surface of the cylinder. Such an arrangement allows for both a sliding and a rotating movement, and yet is in equilibrium for both sliding and rotating motion. This can be a significant advantage where both types of movement are required, for example when a shaft should be supported for rotation whiles allowing axial play. If it is required to permit only rotation or only sliding then the spiral arrangement could be combined with a mechanical or magnetic arrangement to restrain movement of the bearing surfaces relative to one another.

In a further alternative embodiment, the magnet assemblies may be arranged to give spiral joining lines in the same direction about inner and outer bearing surfaces. This arrangement may advantageously produce a screw bearing, for guiding and supporting a helical movement of one part relative to the other.

With multiple magnet assembles on each bearing surface the magnet assemblies may be placed in the same orientation to have N-S and then N-S. Alternatively the orientation may be alternated so that the arrangement is N-S and then S-N. What is important for the proposed bearing is that on the opposed surfaces the magnet assemblies have opposed polarity. Provided this is satisfied then the orientation on each surface can be selected as desired. In some preferred embodiments, multiple magnet assemblies are placed adjacent one another and the joining line between magnet assemblies is used to provide another concentrated magnetic field. For example, three adjacent magnets will have two joining lines and hence may have two gaps in the shield at each of the two joining lines. In a cylindrical bearing surface two or more magnets may be placed about the circumference of the cylinder to provide two or more joining lines and once again the shield may be arranged to have gaps for each joining line.

To create circular or curved geometries for the magnet assemblies, for example a joining line that is a circle on a plane or a ring about an axis, then the magnet assemblies may include curved magnets and/or multiple magnets joined together.

The shield may have a thickness in the range of 0.005 to 2 mm, more preferably 0.01 mm to 1 mm. The thickness may vary for different magnet assemblies. The width of the gap may be in the range 0.005 to 2 mm, preferably in the range 0.01 to 1 mm and this width is preferably constant along the length of the joining line. It is preferred for the gap to extend symmetrically to either side of the joining line.

The magnet assemblies may comprise a common base made of a non-retentive material, for example a base comprising a soft-iron material. The base is preferably joined at the opposite end of the magnet assembly to the shield. The base both supports the magnets and also improves the magnetic field formed at the opposite end at the gap in the shield. It is preferred for the base to be thicker than the shield. The base may take the form of a relatively thick plate across ends of the magnets opposite to relatively thin plates that form the shield.

By non-retentive it is meant that the material has substantially no retentivity for magnetic field such that the remanent magnetization for the material after a magnetic field is removed is substantially zero. A magnetically soft material may be used, for example vanadium permendur is a preferred material for the shield.

The permanent magnet assemblies in preferred embodiments may be similar to those used for magnetic separation of particles as described in EP 1842596. Suitable magnet assembles are supplied by Giamag Technologies AS of Norway.

The magnets may be made of Nd—Fe—B, Sm—Co, or Fe—Pt, for example.

Viewed from a second aspect, the invention provides a method of manufacture of a magnetic bearing comprising: providing first and second bearing surfaces with at least one magnet assembly on each bearing surface, wherein each magnet assembly includes: two permanent magnets located side-by-side with oppositely oriented magnetic field polarities and end surfaces of opposite polarities next to one another, wherein the magnetic anisotropy of the magnets exceeds the magnetic inductance of the material of the magnets; and a shield on a first end of the adjacent permanent magnets, the shield comprising a non-retentive material covering adjacent end surfaces of the two permanent magnets with a gap along a joining line between the two permanent magnets to form a zone of high-gradient magnetic field above the joining line;

locating the first bearing surface and/or the magnet assembly thereof relative to the second bearing surface and/or the magnet assembly thereof such that the magnet assembly on the first bearing surface provides a magnetic field opposed to the magnetic field of the magnet assembly on the second bearing surface, and the first and second bearing surfaces are magnetically repelled from one another in mechanical equilibrium.

The method may include providing features of the bearing surfaces and/or magnet assembly(/ies) in accordance with the first aspect and optional features thereof, as described above. In one example method one bearing surface encloses the other bearing surface, for example as concentric cylinders. In this case the inner bearing surface may be located within the outer bearing surface by using a sliding motion. However, when the bearings are arranged for rotational movement and when there is more than one set of magnet assemblies on each bearing surface then very high forces will be required in order to move the magnet assemblies past one another. This would require a very stiff and strong machine for assembly, which makes a simple sliding technique impractical. For this reason, in a preferred embodiment the method includes separating one bearing surface into two distinct or hinged parts and then locating this bearing surface relative to the other bearing surface by re-joining the two parts. For example, an outer cylindrical bearing surface may be separated into two half cylinders, with or without a hinge, and the two half cylinders can then be placed around the inner cylindrical bearing surface. Alternatively, one or both of the bearing surfaces can be separated into two or more rings, each having one of the magnet assemblies, with the rings then being moved axially into the required location.

Certain preferred embodiments of the invention will now be described by way of example only and with reference to the accompanying drawings, in which.

The preferred embodiments of the invention are magnetic bearings making use of magnet assemblies with a high magnetic field gradient. The magnet assemblies use two permanent magnets with opposite polarisation in a Kittel open domain structure. The underlying principle is described below with reference to FIG. 1

The basic factor of magnetic separation is the magnetic force, which acts on a particle of the substance and which is proportional to the magnetic susceptibility of the substance, the value of the magnetic induction B and the value of the gradient $\nabla B$ of the applied magnetic field. Therefore, increasing the sensitivity and selectivity of magnetic separation will require use of the highest possible values of magnetic induction and magnetic field gradient, or their united factor—the product $B\nabla B$. This product $B\nabla B$ is a parameter relating to the sensitivity and selectivity of magnetic separation and it is not the repulsive force itself, which is a more complicated expression. It is advantageous to increase and also control the product $B\nabla B$ in order to achieve an improved magnetic bearing.

Figure 1:
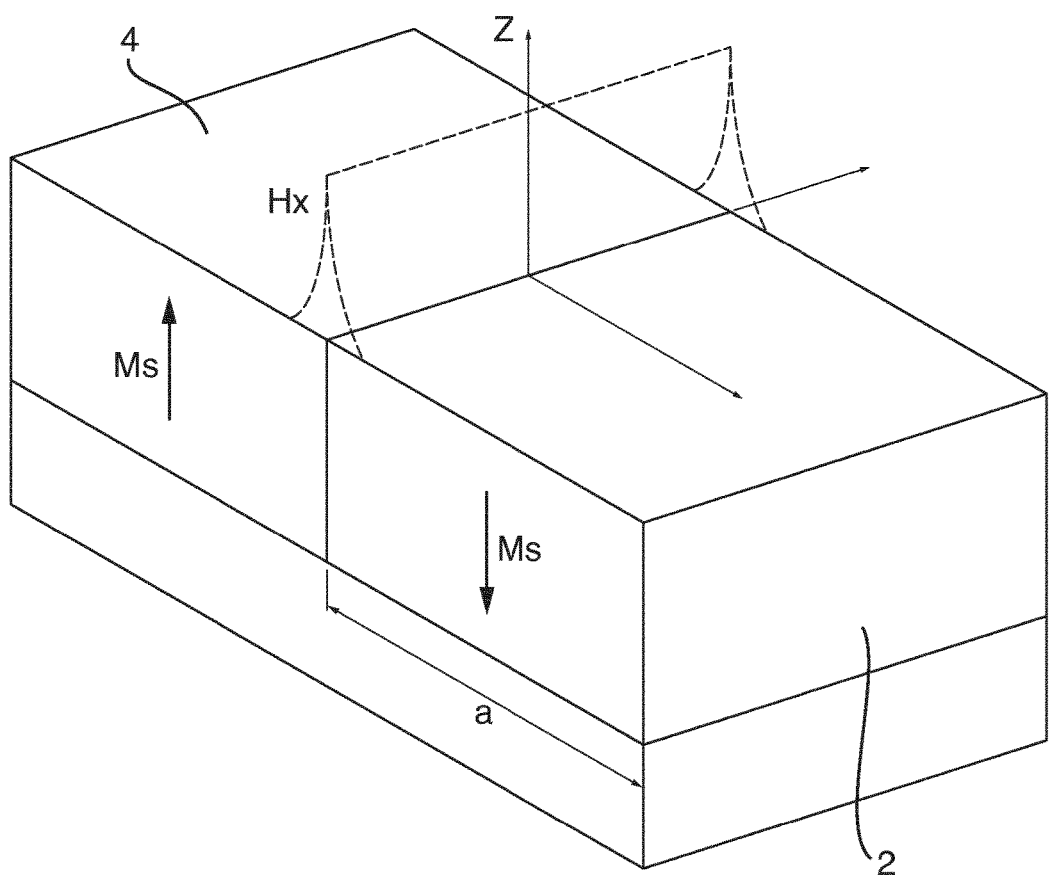
FIG. 1 is an illustration of the Kittel open domain structure of two side-by-side magnets.

FIG. 1 shows a magnetic system having two permanent magnets 2, 4 with opposite magnetization in the form of a Kittel open domain structure. In such a system, near the edges of the faces of the joining magnets, a strong magnetic stray field appears which is caused by the non-diagonal matrix elements of the demagnetization factor tensor, and the value of the product $B\nabla B$ reaches $10^{11}$ mT$^2$/m. On the surface of magnets, in the zone of the upper edges of the joining faces, a strong magnetic stray field appears with the components Hy(x,z), Hz(x,z) and Hx(x,z). The component Hy(x,z) is equal to zero due to the geometry of the system, the vertical component Hz(x,zk) comprises less than half the value of the induction of the magnet material, and the horizontal component Hx(x,z), which in the present case is of greatest interest, can be described by the expression:

$$Hx(x,z)=Ms[\ln(a^2+z^2+2ax+x^2)-2\ln(x^2+z^2)+\ln(a^2+z^2-2ax+x^2)]$$

where:

Ms is the magnetization saturation of the magnets, and a is the size of the magnet along the 0x axis (see FIG. 1).

It follows from this expression that on the plane z=0, at point 0 the horizontal component of the stray field strives into infinity. As a result, in a small area −0.1a×0.1 a, along the line of the joining magnets the horizontal component of the magnetic stray field makes an abrupt jump, which is noted by a dashed line in FIG. 1, the intensity of which can be several times stronger than the induction of the magnet material.

The important practical feature of the magnetic system described is the fact that the stray field Hx(x,z) possesses a high gradient, which in the area near to the point 0 can reach values of $10^6$-$10^9$ mT/m. In this system the value of the product $B\nabla B$ reaches $10^{11}$ mT$^2$/m. The disadvantage of this magnetic system is the impossibility of controlling the form and gradient of the created magnetic fields.

The preferred embodiments use a shield to address this and to considerably increase the magnitude of the product $B\nabla B$ in the zone of separation and also regulate the product $B\nabla B$, which gives the practical possibility of using the high magnetic stray fields for the creation of a magnetic bearing.

Figure 2:
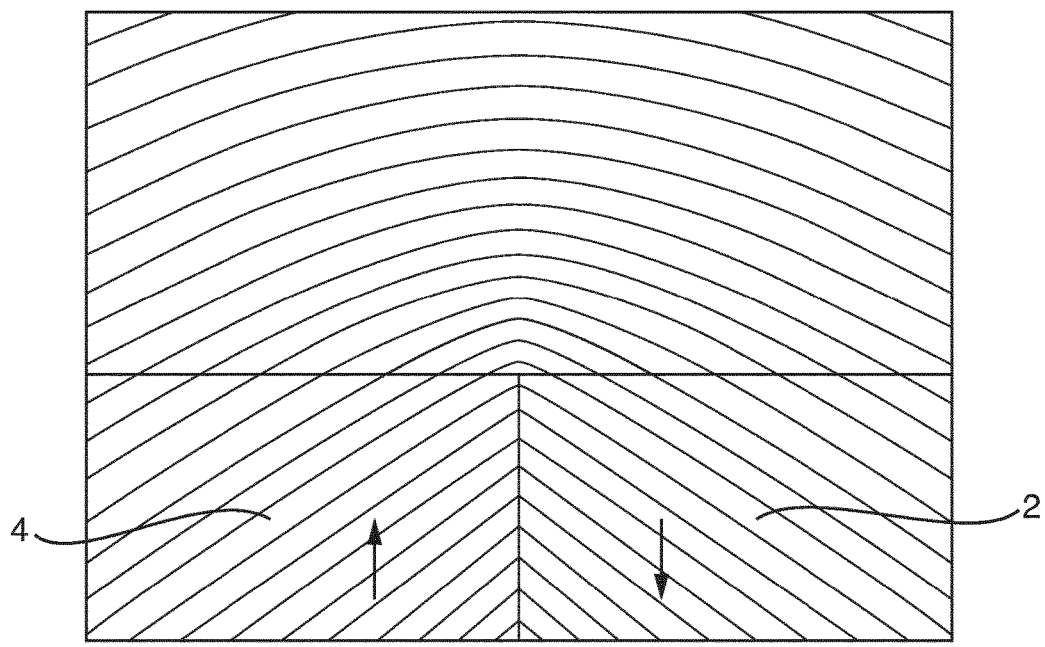
FIG. 2 is a diagram of magnetic force lines in the Kittel open domain structure.
Figure 3:
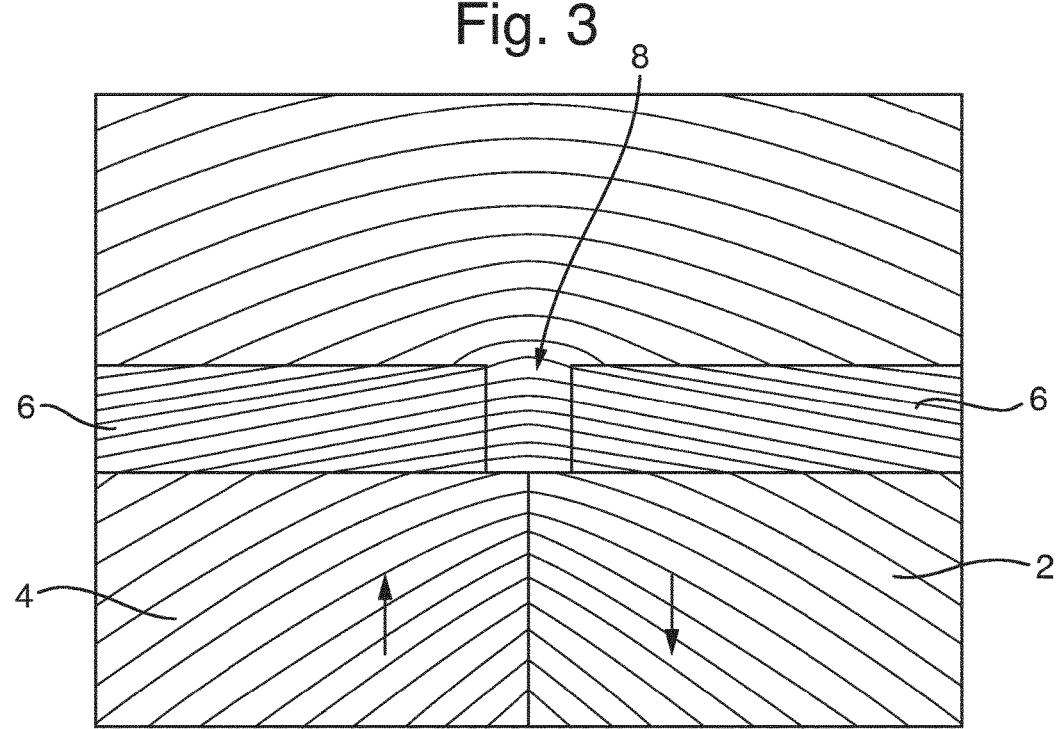
FIG. 3 shows the magnetic force lines in a magnet assembly used in the magnetic bearings of the preferred embodiments.

The illustrations in FIGS. 2 and 3 demonstrate the change in the magnetic field configuration compared to the known open domain structure that is achieved when a shield 6 is added atop the two magnets 2, 4, as in FIG. 3. With this magnetic system there is a concentration of the magnetic field in the zone formed by the gap 8 between the plates of the shield 6, and also a change in the shape of the magnetic force lines, as well as in the magnitude and distribution of the magnetic induction nearby the edges of the joined sides of the magnets. Thus, the use of the shield 6 as described herein makes it possible to change the parameters of the magnetic field considerably, and to create the most suitable conditions for repulsion of bearing surfaces, as in the magnetic bearings of the preferred embodiments.

Figure 4:
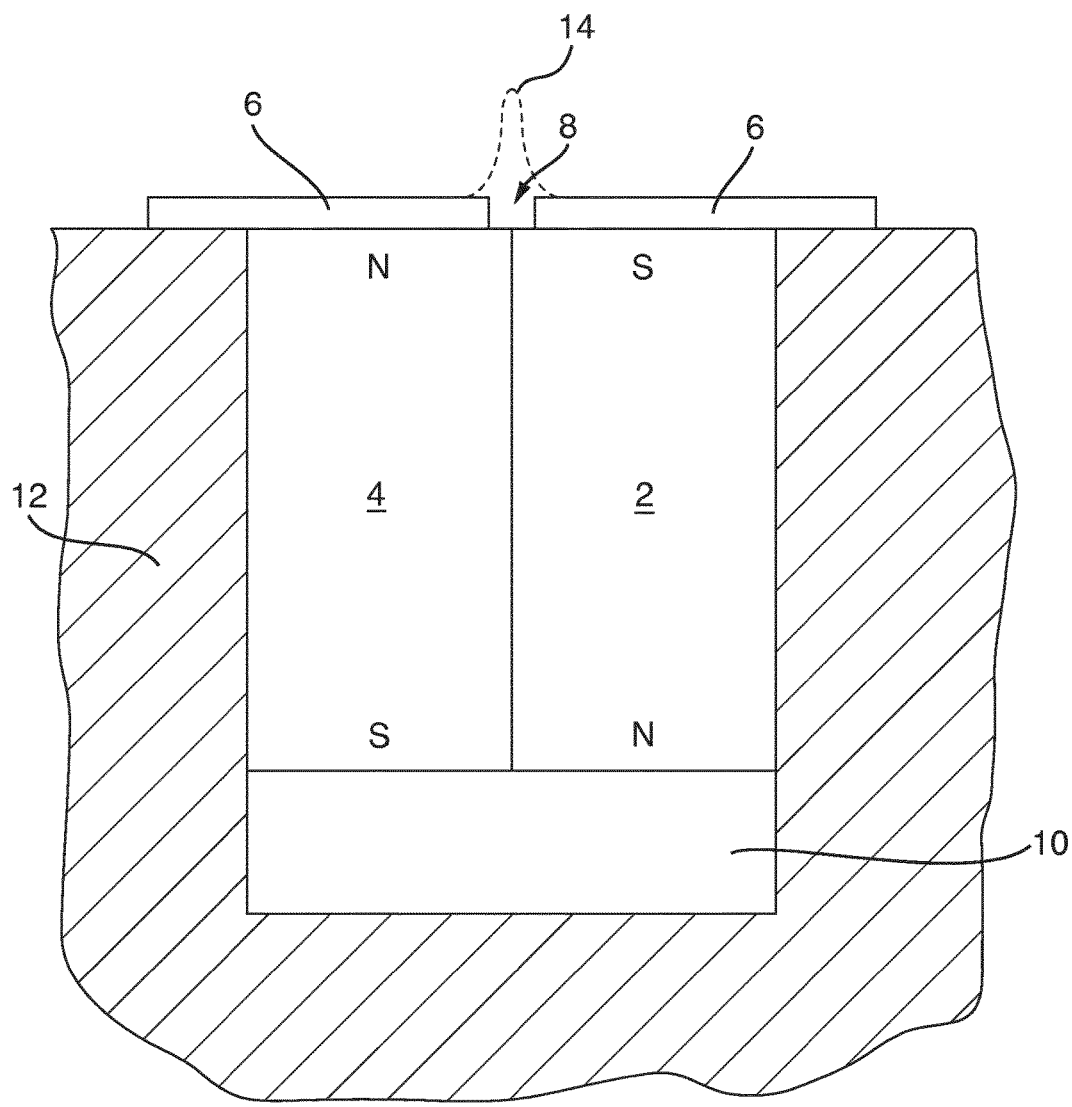
FIG. 4 is a cross section of a magnet assembly used in the magnetic bearings of the preferred embodiments.

FIG. 4 illustrates the features of the magnetic assembly utilised in the preferred embodiments. The magnet assembly is shown in cross-section. Two permanent magnets 2, 4 of the same size and strength are placed adjacent one another with opposite polar orientations. In the example shown the right hand magnet 2 has its north pole facing downward and the left hand magnet 4 has its north pole facing upward. A first end surface of the magnets (the upper end in the orientation shown in FIG. 4) has a shield 6 covering it. The shield 6 is made of relatively thin plates of non-retentive material with a gap 8 at the joining line of the two magnets. The gap 8 is symmetrically arranged with the same extent to either side of the joining line. A base plate 10 is at the opposite end of the magnets 2, 4 to the shield 6. The various parts are supported in a substrate 12, which is a part of a bearing surface. The arrangement of the magnets results in a zone of high magnetic field gradient at the gap 8, as indicated by the dashed line 14. This provides the greatly increased magnitude for the product $B\nabla B$ referenced above. The preferred embodiments utilise this for a repulsion force in magnetic bearings.

It will be understood that with two opposing and oppositely oriented magnet assemblies of the type shown in FIG. 4 then there will be a large repulsive force when the two gaps 8 are aligned. Various arrangements can be used to take advantage of this to provide magnetic levitation for a bearing. The magnet assembly could be generally flat along the joining line between the two magnets 2, 4 and hence could be used for a linear/sliding bearing. Alternatively the magnet assembly could be curved along the line of the joining line and hence used for a rotating bearing. A curved arrangement could be obtained by the use of several smaller magnets if suitably curved larger magnets are not available. The gap 8 may extend around the inner or outer surface of a cylinder or disc to make a ring shaped magnet assembly for a journal bearing. The gap 8 may form a circle on a flat surface to make a thrust bearing. In another alternative the magnet assembly may be arranged to form a spiral along the surface of a cylinder.

Figure 5:
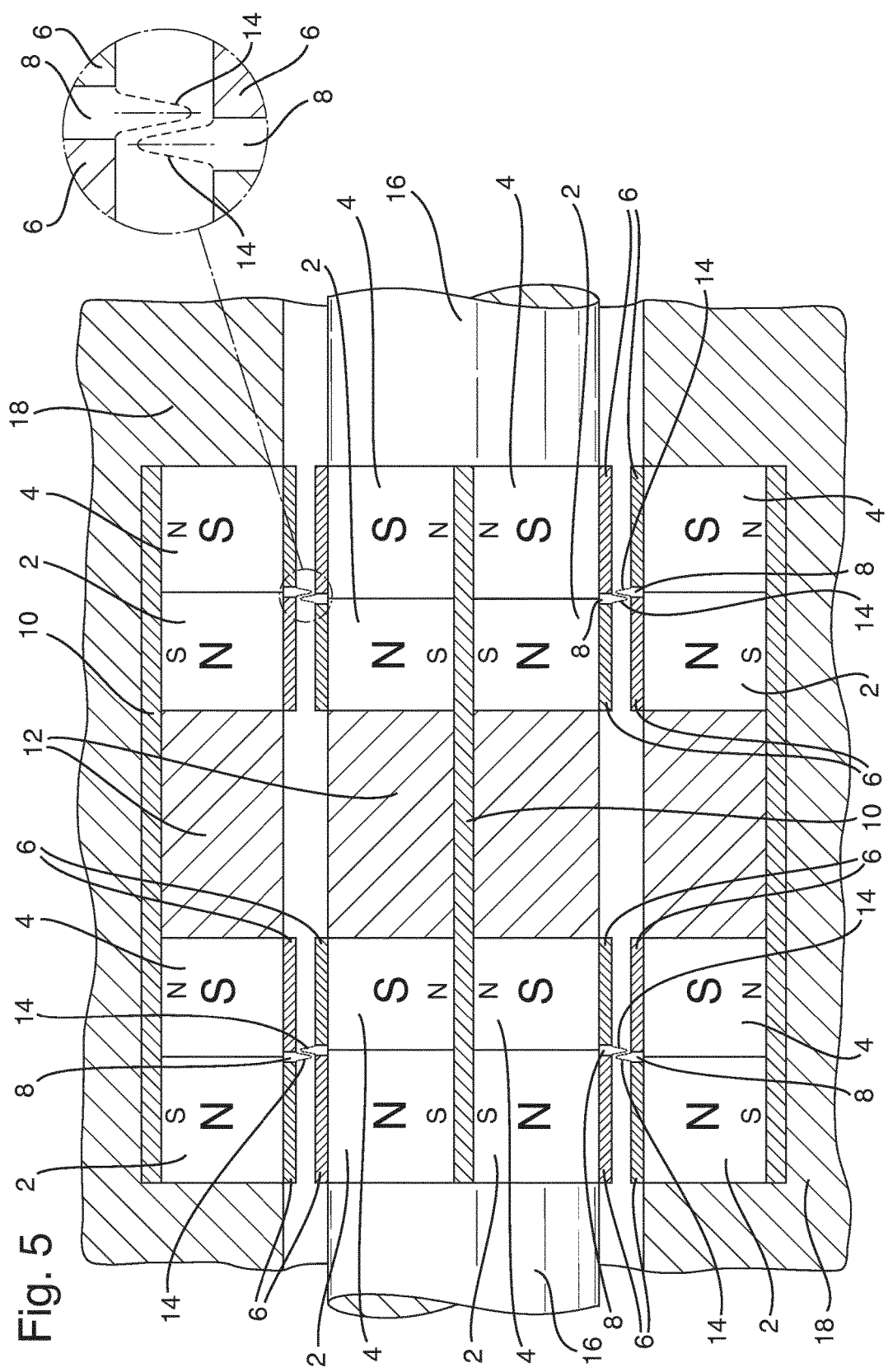
FIG. 5 shows a cross-section of a magnetic journal bearing using two pairs of offset magnetic fields for stability.

An example of a journal bearing is shown in FIG. 5. A shaft 16 is located within a bearing shell 18. The shaft 16 has two pairs of magnet assemblies where the magnets are formed in rings with a circular gap 8 facing outward from the shaft 16. The bearing shell 18 also has two magnet assemblies and these have the gap 8 facing inward. Each of the ring-like magnet assemblies has two magnets 2, 4, a shield 6 and a gap 8 as described in relation to FIG. 4. The base plate 10 is provided for each magnet assembly and the support 12 is provided by the material of the shaft 16 or the bearing shell 18. The magnetic fields 14 extend across a small clearance gap toward each other and provide the repulsive force to carry the bearing forces. It will be seen that there is a small offset such that the centres of the magnetic fields 14 for the shaft magnet assemblies are closer together than the centres of the magnetic fields 14 for the bearing shell magnet assemblies. The shaft 16 is therefore stably supported by the magnet assemblies and movement in either axial direction is opposed by the interaction of the magnetic fields. This hence provides stable mechanical equilibrium.

Figure 6:
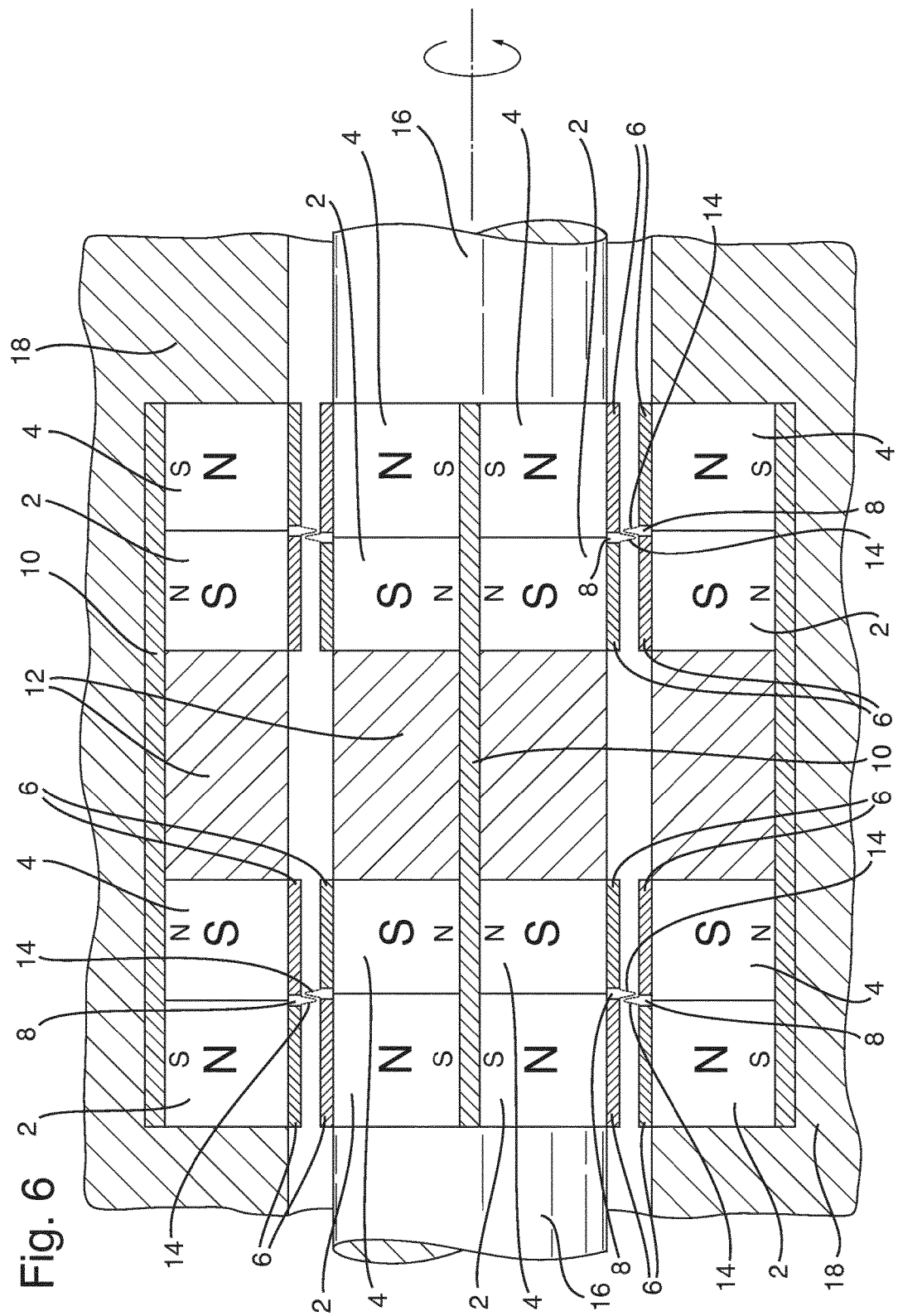
FIG. 6 is a cross-section of a variation of the arrangement of FIG. 5.

FIG. 6 shows a variation on the FIG. 5 arrangement where the opposing magnets at the right hand side are in the opposite polar orientation. Thus, in FIG. 5 the upper line of magnets has, as the lower pole, N-S and then N-S, whereas in FIG. 6 the upper line of magnets has, as the lower pole, N-S and then S-N. Either arrangement will produce the same effectiveness as a bearing.

Figure 7:
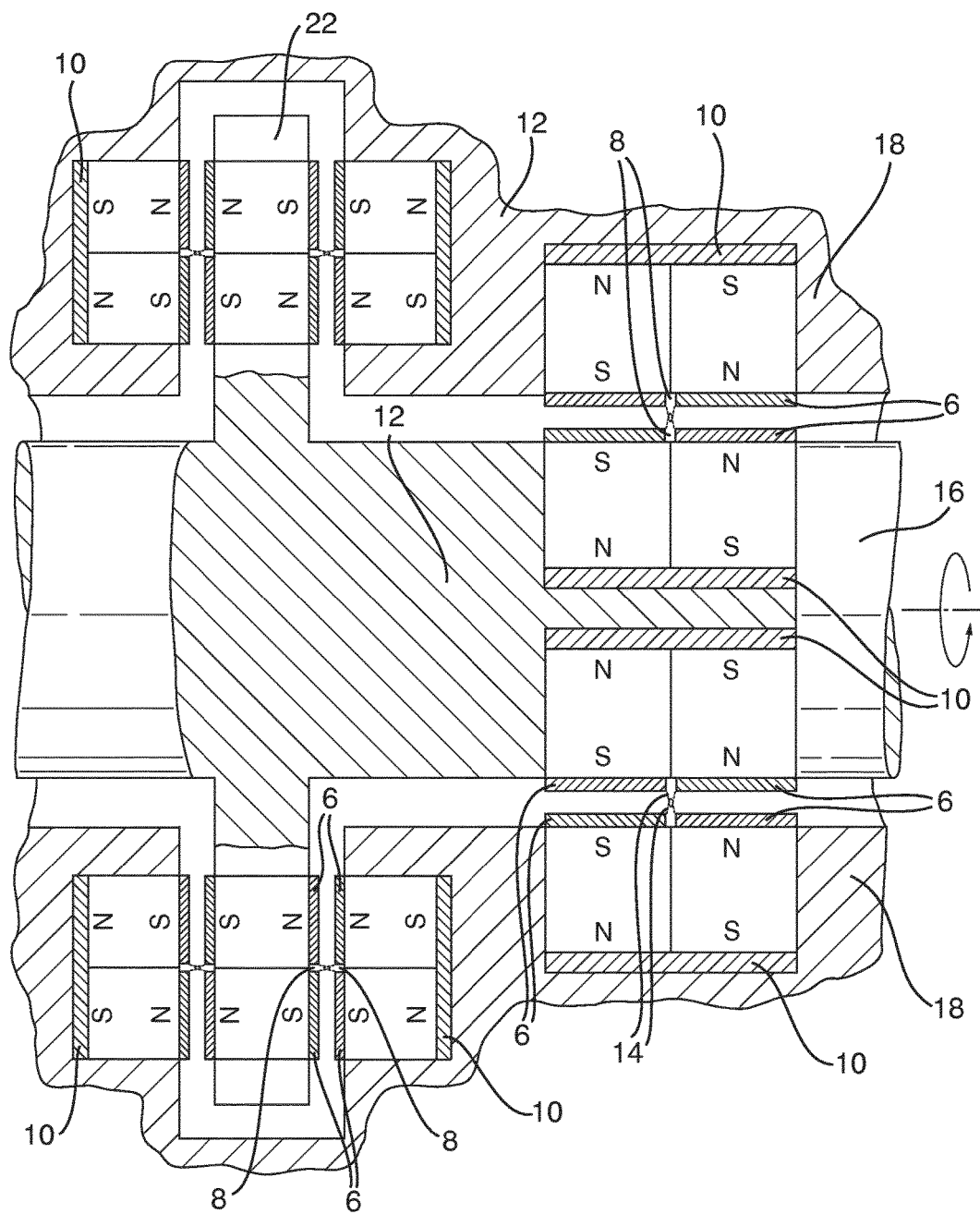
FIG. 7 shows a cross-section of a magnetic journal bearing with a single set of magnet assemblies for radial forces and an additional set of magnet assemblies acting as a thrust bearing for axial forces.

Another example is shown in FIG. 7. In this case the journal bearing, which supports the shaft 16, has only a single pair of magnet assemblies and these have their centre lines aligned so that the gaps 8 and magnetic fields 14 are directly opposed to one another. The magnet assemblies have the same features as described above in relation to FIG. 4. By itself this arrangement would not be stable, since any movement away from alignment would lead to a tendency for a continued movement until ultimately the repulsive forces would not be sufficient to support the bearing forces. However, in the FIG. 7 example there is a further magnetic bearing mounted on a flange 22 and acting as a thrust bearing to withstand forces in either axial direction. It will be understood that this could be used alone as a thrust bearing (for example in combination with a ball bearing as the journal bearing) and also that it could be replaced with an alternative bearing type if appropriate.

The thrust bearing on the flange 22 has circular magnets mounted on the flange and forming circular gaps 8 on both sides of the flange 22. Advantageously the same magnets are used for the two sides of the flange. With this arrangement there is no base plate 10, but instead each end of the magnets has a shield 6 and a gap 8 along the joining line of the magnets. There would typically be a sequence of magnets to form the ring shape about the flange 22. Mounted to the bearing shell 18, in a cavity that encloses the flange 22, are ring shaped magnet assemblies with circular gaps 8 facing inwardly. The two sets of opposing magnetic field could be aligned or alternatively there may be a small offset. An offset, for example with the magnet assembly on the flange 22 having a slightly smaller diameter than the magnet assembly on the bearing shell 18, would give greater stability for the thrust bearing. However it may not be essential to have this in this example since the journal bearing and perhaps also other bearings on the shaft (not shown) will provide radial stability.

Figure 8:
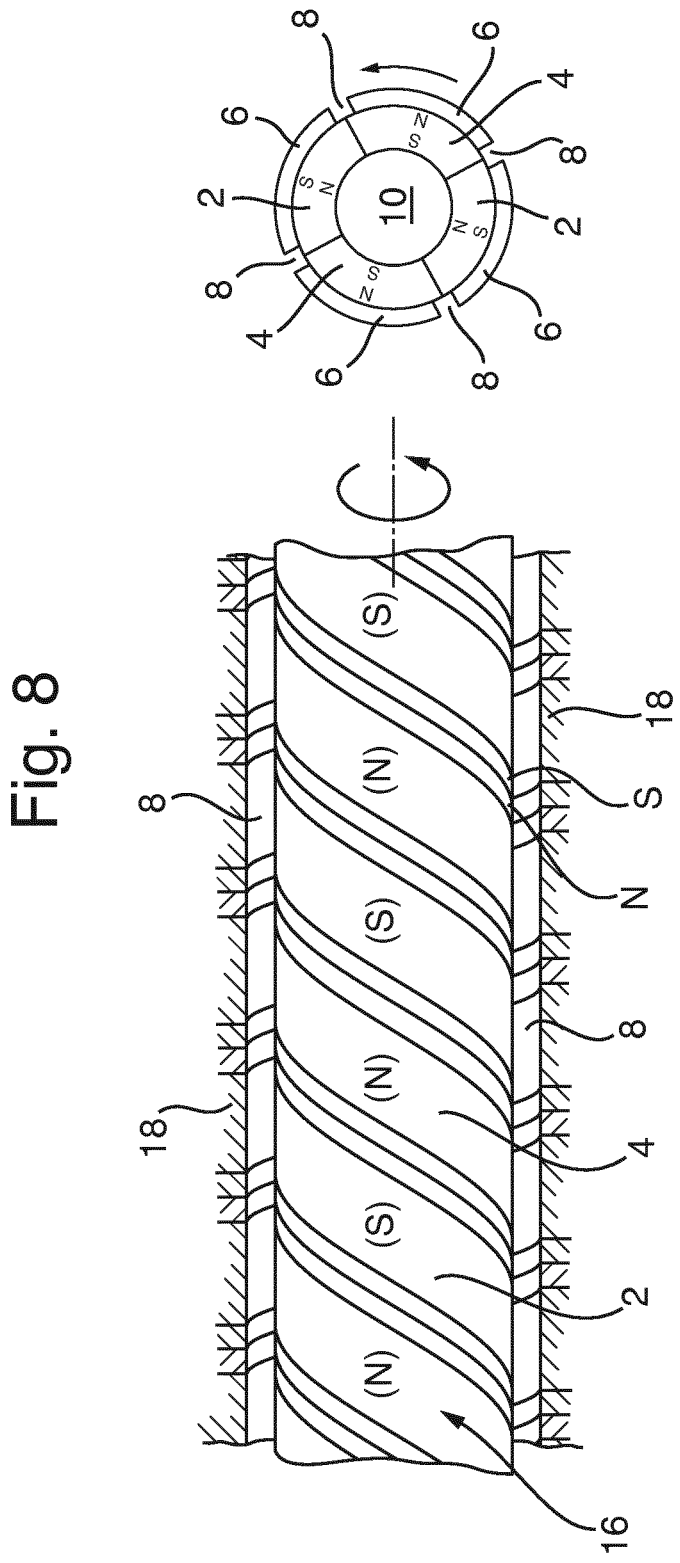
FIG. 8 is an example of a magnetic bearing using spiral shaped magnet assemblies.

An example of bearing surfaces using spiral magnet assemblies to support a shaft is shown in FIG. 8. The shaft 16 is held within a bearing shell 18 and they are provided with spiral magnet assemblies with opposite directions of turn. In this example the shaft 16 has two magnet assemblies coiled around the shaft 16 in a first direction, and the bearing shell will have an equivalent number of magnet assemblies coiled around the inner surface thereof in the opposite direction. The crossing points where the gaps 8 on the inner and outer magnet assemblies cross one another will provide the repulsion to hold the bearing forces. In this example, as can be seen from the cross-section through the shaft, whilst there are only four magnets in total it is nonetheless possible to create four gaps 8 since the magnets join to one another on both lateral sides. The common base 10 for the magnets on the shaft 16 is provided by the shaft material. This arrangement will allow for both rotating and sliding movement of the shaft 16. Where only one type of movement should be permitted then an additional bearing or other restraint could be included.

The invention claimed is:
1. A magnetic bearing comprising:
   first and second bearing surfaces;
   at least one magnet assembly on each bearing surface, wherein each magnet assembly includes:
      two permanent magnets located side-by-side with oppositely oriented magnetic field polarities and end surfaces of opposite polarities next to one another, wherein the magnetic anisotropy of the magnets exceeds the magnetic inductance of the material of the magnets; and
      a shield on a first end of the adjacent permanent magnets, the shield comprising a non-retentive material covering adjacent end surfaces of the two permanent magnets with a gap along a joining line between the two permanent magnets to form a zone of high-gradient magnetic field above the joining line;
   wherein the magnet assembly on the first bearing surface provides a magnetic field opposed to the magnetic field of the magnet assembly on the second bearing surface, and
   wherein the magnetic bearing is arranged such that the first and second bearing surfaces are magnetically repelled from one another in mechanical equilibrium.
2. The magnetic bearing as claimed in claim 1, wherein the magnet bearing comprises a plurality of magnet assemblies.
3. The magnetic bearing as claimed in claim 1, wherein the two bearing surfaces are in close proximity to one another.
4. The magnetic bearing as claimed in claim 1, wherein the separation between the two bearing surfaces at the locations of the opposed magnet assemblies is less than 0.5 mm, preferably less than 0.4 mm and more preferably less than 0.2 mm.
5. The magnetic bearing as claimed in claim 1, wherein the bearing surfaces are cylindrical, with cylindrical magnet assemblies providing repelling forces to support a shaft while stationary and/or during rotation.
6. The magnetic bearing as claimed in claim 5, wherein the magnet bearing comprises a shaft supported for sliding movement by an arrangement of magnet assemblies along the length of tubular bearing surfaces.
7. The magnetic bearing as claimed in claim 6, wherein a joining line of the magnet assembly on the first bearing surface is aligned with, in parallel with and directly opposes a joining line of the magnet assembly on the second bearing surface.
8. The magnetic bearing as claimed in claim 7, wherein the bearing also comprises a restraining mechanism to ensure that the two joining lines remain aligned.
9. The magnetic bearing as claimed in claim 7, wherein the joining lines are parallel and the centre of the magnetic field of the magnet assembly on the first bearing surface is offset by a small amount from the centre of the magnetic field of the magnet assembly on the second bearing surface.
10. A method of manufacture of a magnetic bearing comprising:
   providing first and second bearing surfaces with at least one magnet assembly on each bearing surface, wherein each magnet assembly includes:
      two permanent magnets located side-by-side with oppositely oriented magnetic field polarities and end surfaces of opposite polarities next to one another, wherein the magnetic anisotropy of the magnets exceeds the magnetic inductance of the material of the magnets; and a shield on a first end of the adjacent permanent magnets, the shield comprising a non-retentive material covering adjacent end surfaces of the two permanent magnets with a gap along a joining line between the two permanent magnets to form a zone of high-gradient magnetic field above the joining line; and locating the first bearing surface and/or the magnet assembly thereof relative to the second bearing surface and/or the magnet assembly thereof such that the magnet assembly on the first bearing surface provides a magnetic field opposed to the magnetic field of the magnet assembly on the second bearing surface, and the first and second bearing surfaces are magnetically repelled from one another in mechanical equilibrium.

11. The method as claimed in claim 10, wherein the magnet bearing comprises a plurality of magnet assemblies.

12. The method as claimed in claim 10, wherein the two bearing surfaces are located in close proximity to one another.

13. The method as claimed in claim 10, wherein the separation between the two bearing surfaces at the locations of the opposed magnet assemblies is less than 0.5 mm, preferably less than 0.4 mm and more preferably less than 0.2 mm.

14. The method as claimed in claim 10, wherein the bearing surfaces are cylindrical, with cylindrical magnet assemblies providing repelling forces to support a shaft while stationary and/or during rotation.

15. The method as claimed in claim 14, wherein the magnet bearing comprises a shaft supported for sliding movement by an arrangement of magnet assemblies along the length of tubular bearing surfaces.

16. The method as claimed in claim 15, wherein a joining line of the magnet assembly on the first bearing surface is aligned with, in parallel with and directly opposes a joining line of the magnet assembly on the second bearing surface.

17. The method as claimed in claim 16, comprising providing the bearing with a restraining mechanism to ensure that the two joining lines remain aligned.

18. The method as claimed in claim 15, wherein the joining lines are parallel and the centre of the magnetic field of the magnet assembly on the first bearing surface is offset by a small amount from the centre of the magnetic field of the magnet assembly on the second bearing surface.

* * * * *